Nov. 11, 1947. P. B. HOYE 2,430,510
ELECTRICAL BUS CONSTRUCTION
Filed Aug. 10, 1942 2 Sheets-Sheet 2
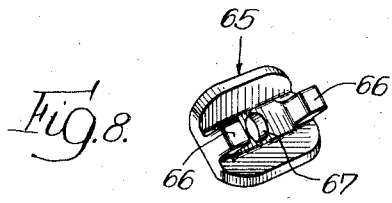
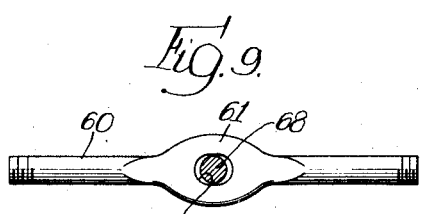
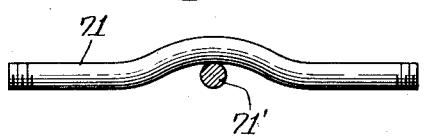
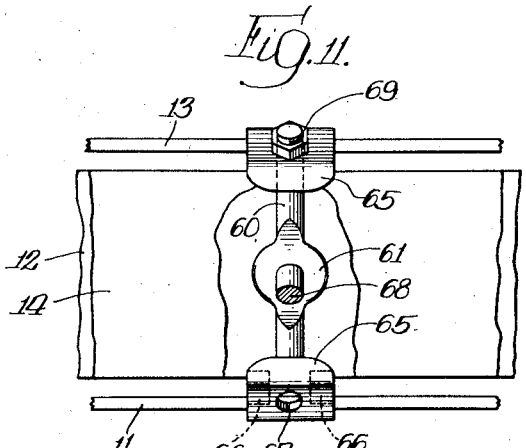
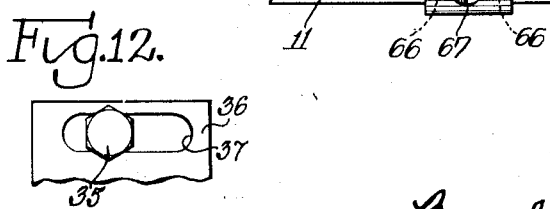
INVENTOR.
Peder B. Hoye,
BY
Atty's.

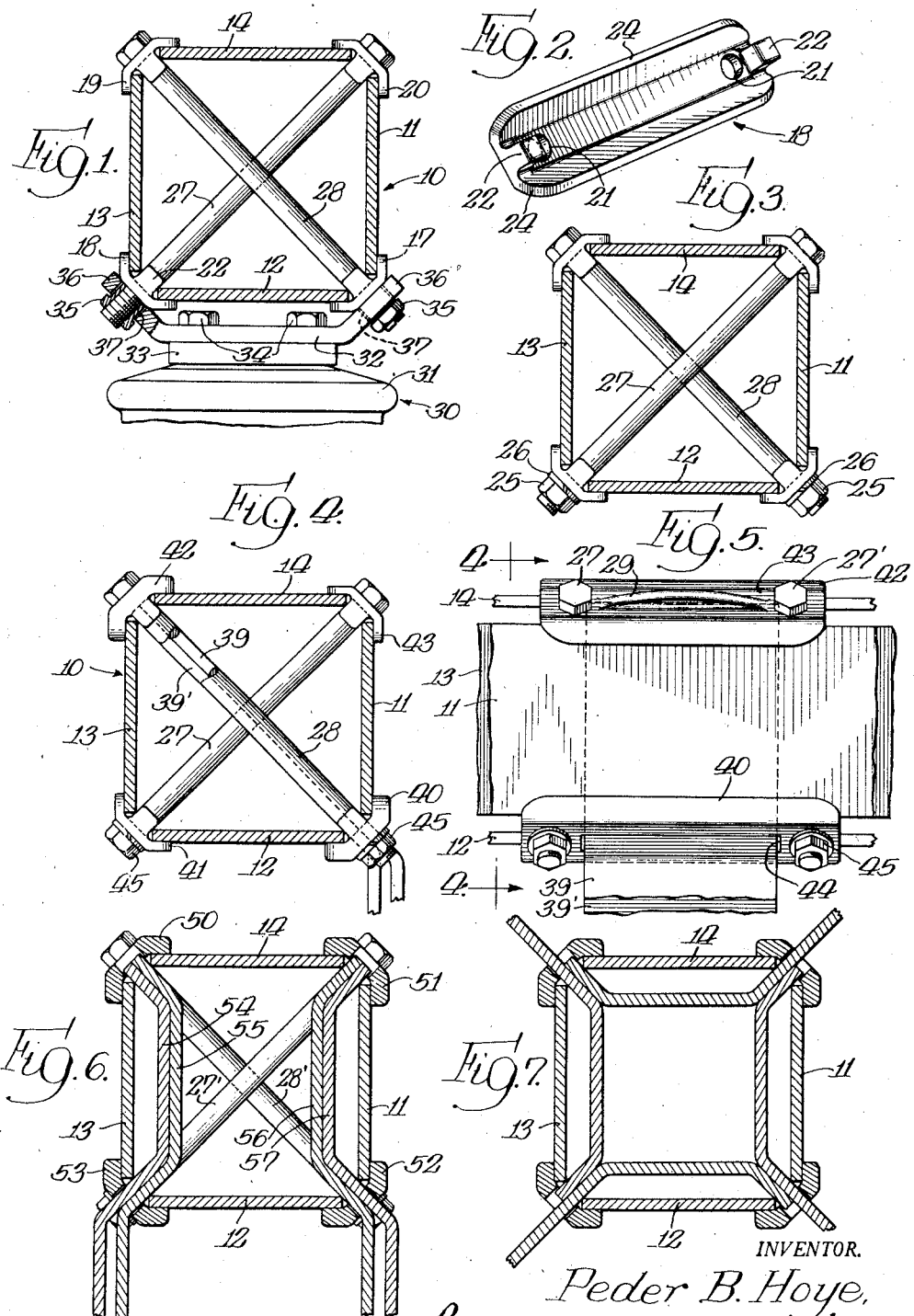

Patented Nov. 11, 1947

2,430,510

UNITED STATES PATENT OFFICE 2,430,510

ELECTRICAL BUS CONSTRUCTION

Peder B. Hoye, Maywood, Ill., assignor to Electrical Engineers Equipment Co., Melrose Park, Ill., a corporation of Illinois Application August 10, 1942, Serial No. 454,236

3 Claims. (Cl. 174—129)

This invention relates to electrical bus construction, and more particularly to clamping means for the forming and supporting of hollow electrical buses.

Bus bars are in extensive use in power stations, substations, switch houses, and switch boards for carrying heavy currents. Though the buses commonly used are in rod, tubular, or bar form, when high currents are to be carried, tubular buses are indicated for they have a much lower "skin-effect resistance" than rods or strap bars. Tubular or cylindrical buses, however, are not easily mounted or tapped so it is preferable to substitute hollow buses having a rectangular or other polygonal cross-section which are also efficient conductors for high currents, and good dissipators of heat.

It is the general object of this invention to provide clamping and supporting means for buses having such polygonal cross sections. The clamping means serves the dual purpose of both forming the polysided bus and also clamping it to the supporting means. That is, the bars or straps which go to form the hollow bus are firmly held in fixed relative position to each other in order to construct the bus; and then, in addition, the constructed bus is affixed to insulated supporting means. The construction of the bus and the mounting of it are greatly simplified by my invention.

A further advantage of my clamping device is that it permits of free longitudinal expansion or contraction without distortion of the bus, the support, or the clamping means.

The use of my clamping means does not necessitate the drilling or other placing of holes through any portion of the bus. The bus remains completely intact.

Another advantage is that free circulation of air or other medium into and out of the hollow interior is possible at all times for cooling purposes.

A still further advantage is the ease of production of my clamping means and its inexpensiveness. The parts are simple and readily interchangeable.

These and other advantages will become apparent as I describe, in conjunction with the accompanying drawings, a preferred embodiment of my invention.

In the drawings:

Figure 1 is a vertical section of a hollow bus bar held together and mounted on a supporting member by means of my clamping device;

Figure 2 is a perspective view of a clamp member forming a part of my clamping device;

Figure 3 is a vertical section of the same hollow bus bar showing how it is clamped together at points intermediate the support members;

Figure 4 is a vertical cross section of a hollow bus bar, taken along the line 4—4 of Figure 5, showing a two-bar tap therefrom;

Figure 5 is a side elevation of Figure 4;

Figure 6 is a vertical cross section of a hollow bus bar showing a four bar tap therefrom;

Figure 7 is a vertical cross section of a hollow bus bar showing another manner of making a four bar tap;

Figure 8 shows a modified form of clamp with a single bolt hole;

Figure 9 is an elevational view of a modified bolt having a widened central portion;

Figure 10 shows another modification of bolts wherein each bolt has an arch at its central portion where the bolts cross each other;

Figure 11 shows a plan view, partially broken away, to illustrate the use of the bolt of Figure 9; and Figure 12 is a fragmentary detail view showing the elongated slots in the insulator brackets for permitting longitudinal expansion and contraction of the bus bar relatively to the supporting insulators.

Referring first to Figure 1, it will be seen that the hollow bus is represented generally by the numeral 10. The four flat copper bars are numbered respectively 11, 12, 13 and 14. At each of the four corners are bronze clamps or flanges, such as are illustrated in Figure 2, which are numbered 17, 18, 19 and 20. Taking clamp 18, for example, and viewing it in perspective in Figure 2, we see that it is generally channel-shaped. In the central portion of the channel and near the ends are two holes 21, 21 through which bolt shanks or their threaded ends may be inserted. Extending from the central portion of the channel at each end are two tongues 22, 22 whose width is equal to the diameter of the holes 21, 21 or slightly greater. These tongues 22, 22 are inserted at the corner between the flat copper bars, such as 12 and 13, and thus space the bars apart (see Figure 1). The gaps thus produced between the bars (see Figure 5) permit a free circulation of air or other medium through the hollow conductor. The upturned arms 24, 24 of the clamp 18 are at such an angle as to engage their whole surface along the outer surface of the bars 12 and 13. Though the hollow conductor is shown as having a square cross section, it is understood that other cross sections and shapes are possible—in which case the angle of the upturned arms 24, 24 of each of the clamps would be varied so as to retain full engagement of the surfaces of the arms with the surfaces of the abutting bars. The arms may be made of any convenient length up to one-half the width of the bars which are engaged. In fact the arms may be interdented and thereby overlapped on the sides of the bars.

Such a clamp as clamp 18 is placed at each of the four corners, and two pairs of diagonally-opposed bolts, 27 and 28 and 27' and 28' (the latter pair being invisible in Figures 1 and 3), are inserted through the holes, such as holes 21, 21, and nuts are threaded on the ends of the bolts and drawn up to form a rigid, stable bus bar. Stability is provided by the edges of the bars being forced into the corners formed by the tongues 22, 22 and arms 24, 24 of each of the clamps. In Figure 3 merely nuts 25, 25 with lock washers 26, 26 are threaded on to the bolts 27 and 28 (the second pair of bolts 27' and 28' lie behind bolts 27 and 28 and cannot be seen in the figure). But in Figure 1 the bus is not only formed rigidly by drawing up the nuts 35, 35, but is also affixed to the bus support member 30. (See Figure 1.)

The support member 30 is composed of an insulating cylinder 31, a bracket 32 having a collar 33 and bolts 34, 34 joining the bracket to the insulating cylinder or post type insulator 31. The bracket 32 has arms 36, 36 upturned to meet the bolts 27 and 28 at such an angle as to engage the surfaces of the clamps 18 and 17. In these arms 36, 36 are slots 37, 37 whose longitudinal axes are parallel to that of the bus bar (see Figure 12) and through which are inserted the threaded ends of bolts 27 and 28 (and the ends of a corresponding pair of bolts 27' and 28' which are hidden from view behind bolts 27 and 28). The nuts 35, 35 have integral sleeve portions with outside diameters less than the width of slots 37, 37 which thread onto the bolts 27 and 28. The heads of the nuts 35, 35 have outside diameters substantially greater than the width of slots 37, 37 and therefore cannot pass therethrough.

When nuts 35, 35 are drawn up tightly on bolts 27 and 28 (and on the corresponding pair behind them) the copper bars 11, 12, 13 and 14 will then be rigidly formed into a hollow body. The longitudinal edges of these bars will be firmly held between the tongues and arms of each of the clamps 17, 18, 19 and 20 and will be fixedly spaced with relation to one another.

The clamps 17 and 18 rest flat against the arms 36, 36 of bracket 32. But since the heads of nuts 35, 35 do not engage the under surface of arms 36, 36—there is a gap between them—and since the diameters of the sleeves of these nuts are less than the width of slots 37, 37, the bus bar 10 may slide along these arms 36, 36 within the limits of the longitudinal slots 37, 37. This is important, for heating caused by the resistance offered to the flow of current in the bus causes it to expand. With the clamping device of my invention this expansion and contraction is perfectly safe and causes no buckling of the bus and no stress on its supports.

To clamp the bus immovably to the bus support at some place—at an end or in the middle—it is only necessary to insert washers or sleeves between the heads of nuts 35, 35 and the arms 36, 36 of bracket 32. These washers need only be long enough so that the end of the sleeve portions of nuts 35, 35 will not bear against the clamps 17 and 18 when nuts 35 are drawn up tight on the bolts. In this way the clamps 17 and 18 will be drawn tightly against the arms 36, 36 of the bracket. It is generally more satisfactory to clamp the bus bar immovably at one of its middle supports and let it expand toward both ends rather than fastening it tightly at one end and allowing the other end to do all the moving.

Figure 3 represents the clamping arrangement employed on the bus bar between the points of support. As was indicated earlier, nuts 25, 25 and lock washers 26, 26 alone are employed since the clamping device is here used merely to maintain and strengthen the structural form.

In Figures 4 and 5 is shown the method of tapping the bus bar 10. Though copper bars of standard or of any suitable size may be used to tap bus bar 10, the bars 39 and 39' which are illustrated are of the same width and thickness as the bars 11, 12, 13 and 14 which go to make up the hollow bus itself. These two bars 39 and 39' form a tap of one-half the capacity of the bus. These dimensions are illustrative and not limiting. The two bars or straps are shown partially in dotted outline since they are partially concealed behind bolt 28. They run diagonally from one corner to the opposite corner, then through a clamp 40, which has a slot 44 therefor, and out to the open where they may be directed as desired. These taps are secured to the bus in the following manner:

A place is chosen anywhere along the bus where the tap is desired. At that point bolts 27 and 28 (and two others not visible) are inserted diagonally through the bus to fasten the clamps 40, 41, 42 and 43 in place. Lock washers and nuts 45, 45 are next threaded on. Then while the nuts 45, 45 (there are four bolts and nuts for each set of four clamps) of the bolts 27 and 28 are still loose, the taps are inserted through the slots 44 of the clamp 40. The ends of these taps are pushed between bars 11 and 12 diagonally across the bus 10, between the adjacent edges of the bars 13 and 14, and a short distance beyond. Then the nuts 45, 45 are tightened up so that all of the clamps press the edges of the bars of the bus tightly against either the tap bars or, in the corners where there are no tap bars inserted, against the bolt shanks and the tongues of clamps 41 and 43. This pinching action grips the tap bars very firmly for their combined thickness equals or is slightly greater than that of the tongues 22 of the clamps or the diameters of the bolts. Such high pressure line contacts between the tap bars and the bars of the bus provide an excellent path for electricity for they offer little resistance to the current flow. This limited area high pressure contact is of marked advantage in securing and maintaining a low resistance joint, as is well known to those skilled in the art.

It will be noted that the clamps 40 and 42 are thicker than clamps 41 and 43. This is desirable for purposes of strength since clamps 40 and 42 have slots through which the tap bars 39, 39' pass. The thinner clamps, such as 41 and 43 of Figures 4 and 5, and clamp 18 of Figure 2, each have a ridge 29 on their outer side to increase their strength as may be seen in Figure 5.

In Figures 4 and 5 the spacing of the bolt holes in the clamps may be seen most easily. The two bolts passing through clamp 43 lie inside the two bolts passing through clamp 40, so that they cross but do not intersect. This particular arrangement is not the only one possible, for the clamp 43 might be made wider than clamp 40 so that the bolts of clamp 43 would both lie outside those of clamp 40. Or the length of these clamps and the position of the holes through them may be such that both bolts of one clamp will pass on either the right or on the left sides of the bolts of the other clamp.

The clamps in Figure 3 may be the same size and have the holes drilled in the same places for uniformity, savings of material, interchangeability, and ease of production. Then in applying them, diagonally opposed pairs will be offset from one another sufficiently to allow the bolts to pass by each other. Other sizes, arrangements and standardizations are possible without departing from the scope of my invention.

In Figures 9 and 10 are shown modified forms of bolts for clamping the bus bars together. In Figure 9 the bolt 60 has threads at either end instead of on one end only. At its center the bolt has a widened and flattened portion 61 through which there is a hole 62. Hole 62 permits a straight bolt to pass therethrough. With such a construction only two bolts, instead of four, are needed for clamping the bus bars together. The short clamp of Figure 8 with a single hole therethrough is then used instead of the long clamp of Figure 2. Since the widened portion 61 of bolt 60 is less thick than the ends of the bolt this bolt 60 may be inserted through the gaps between the edges of the bars 11, 12, 13 and 14. A straight bolt is then passed through a gap between the bars, diagonally through the hole 62 and thence through a gap on the opposite side of the bus conductor. The short clamps 65 of Figure 8 are placed at each corner with their tongue portions 66, 66 between the edges of bus bars 11, 12, 13 and 14. The ends of the bolts 60 and 68 (see Figure 11) will protrude through the hole 67 of each clamp 65. Nuts, such as nut 69 of Figure 11, will then be threaded down tightly on the ends of the bolts 60 and 68 to rigidly hold the bus bars in spaced relation to each other.

Figure 10 shows another arrangement using two bolts instead of four. Here the bolts 71 and 71' each have an arch or offset portion at their midsection so that the bolts may pass each other and yet lie substantially in the same plane. Short clamps such as clamp 65 of Figure 8 are also used with bolts 71 and 71'. It is also possible to use two straight bolts passing each other side by side with the one-hole clamps of Figure 8. However, the bolts illustrated in Figures 9 and 10 give more rigidity than would two straight bolts side by side.

The clamp of Figure 8 is similar in construction to the clamp of Figure 2 in that the clamps are formed at an angle to flatly engage the surfaces of the bus bars when the tongues 66, 66 are inserted between the edges of adjacent bars. However, the clamp of Figure 8 is smaller since it carries but a single bolt hole through its channel portion.

In Figure 6 is shown a four bar tap of the hollow bus conductor which tap has the same capacity as the bus. In this case the clamps 50, 51, 52 and 53 are all of the thicker type having a slot through the central portion through which the tap bars may pass. The two tap bars 54 and 55 are both clamped at their upper ends between the edges of bus straps 13 and 14, and are clamped a second time by the edges of bus bars 12 and 13 before they pass from the bus through clamp 53 to the outside. The pair of tap bars 56 and 57 are attached in a similar manner on the other side of the bus and pass therefrom through a slot in clamp 52. As was true in the case of Figures 4 and 5, the combined thickness of the pairs of tap bars is as great or greater than the thickness of the tongues on the clamps or the diameter of the bolts. Therefore when the nuts on bolts 27', 28', 27 and 28 are drawn up tightly the edges of the bus bars firmly grip the bars forming the taps and produce line contacts of high pressure. Such contacts offer little resistance to the flow of current.

In Figure 7 is shown a way of leading a tap bar from each corner of the bus. Eight taps may be provided by extending the four ends which are shown in Figures 6 and 7 as being foreshortened.

It may be seen that varied members and capacities of bus taps may be taken and may be led out at different corners. In each case the tightening of the nuts on the bolts grips the taps securely and will produce high pressure line contacts between the bus bars and the tap bars for the free flow of current from the bus to the taps.

Another advantage of my device is that the taps may have their ends preformed for easy insertion in and attachment to the bus as and where needed. Some of these taps may be preformed in the shape of taps 39 and 39' of Figure 4; others may be preformed in the shape of taps 54, 55, 56, and 57 of Figure 6; and other standardized shapes may be formed depending on the requirements to be met.

It will be apparent that the bus may be made in the cross section of any polygon, due regard being had to the angularity of the clamps to fit the corners and to the bolting arrangement to hold the clamps in place.

While I have described and illustrated my invention by certain specific embodiments, these are not to be considered limiting, for numerous changes and variations are possible without departing from the scope of my invention.

I claim:

1. In combination, a hollow polygonal bus conductor comprising clamps of angular cross section, a plurality of flat bus bars disposed parallel to each other in symmetrical position about a common longitudinal axis, said clamps engaging the adjacent margins of adjacent bars, bolts extending entirely through said hollow conductor and joining opposed clamps at diagonally opposite corners of said hollow conductor to hold the bars in the form of a hollow bus of approximately polygonal cross section; and supporting means for slidingly supporting said hollow bus comprising an insulating member, a bracket which is affixed at its central portion to said insulating member and has slotted sides upturned at an angle, the hollow bus conductor resting thereon; the slots in said slotted sides extending longitudinally of said bus conductor, and flanged nuts having sleeve portions which pass through the slots in said slotted sides for engaging the threaded ends of the bolts of said hollow bus and bear against the adjacent clamps of said bus, the flanges of said nuts being spaced out of contact with said slotted sides by the engagement of said sleeve portions against said adjacent clamps whereby said sleeve portions are free to slide sidewise in said slots to permit endwise shifting movement of said hollow bus conductor relatively to said bracket, said flanges of the nuts lying outside the slots in said upturned arms and being of a diameter greater than the width of said slots.

2. In combination, a hollow polygonal bus conductor comprising clamps of angular cross section, a plurality of flat bus bars disposed parallel to each other in symmetrical position about a common longitudinal axis, said clamps engaging the adjacent margins of adjacent bars, bolts extending entirely through said hollow conductor and joining opposed clamps at diagonally opposite corners of said hollow conductor to hold the bars in the form of a hollow bus of aproximately polygonal cross section; supporting means for said hollow polygonal bus comprising an insulating member and a bracket affixed thereto, said bracket having a central portion and upturned sides with slots therein on which sides the hollow bus conductor rests and to which sides said conductor is affixed by means of said bolts passing through said slots, said slots extending parallel to the length of said bus conductor, nuts on said bolts, and spacing means mounted on said bolts within said slots enabling clamping pressure to be maintained on said clamps through said bolts while still leaving said bolts free to slide sidewise in said slots for accommodating endwise expansion and contraction of said bus conductor.

3. In an electric bus conductor constructed substantially in the form of a hollow square, the combination of four flat bus bars grouped to form the four sides of said hollow square, the adjacent edges of adjacent bus bars being spaced from each other to form spacing gaps at the four corners of the square extending longitudinally of the bus bar, four separate clamps extending into said spacing gaps at the four corners of said hollow square, each of said clamps comprising abutment surfaces against which the adjacent edges of adjacent bus bars have edgewise abutment contact, tension bolts extending crosswise of each other and passing entirely through said hollow square and through said spacing gaps and engaging pairs of clamps at diagonally opposite corners of said square, said bolts constituting the only tying connection between diagonally opposite corners of said square, and said bolts coacting with said clamps to establish edgewise compression pressures in each of the flat bus bars against the abutment surfaces of said clamps; supporting means for said hollow square comprising an insulating member and a bracket affixed thereto, said bracket having a central portion and upturned apertured sides on which sides the hollow bus conductor rests and to which sides the bus conductor is affixed by means of said bolts passing through the apertures in said upturned sides, said apertures being elongated in a direction parallel to the length of said bus conductor, and threaded means on said bolts each having a portion tightly holding the bolts and another portion spaced from the bracket enabling the bolts to slide sidewise in the elongated dimension of said apertures for accommodating thermal expansion and contraction of said bus conductor.

PEDER B. HOYE.

REFERENCES CITED

The following references are of record in the file of this patent:

UNITED STATES PATENTS

| Number | Name | Date |
|---|---|---|
| 1,724,887 | Schramm | Aug. 13, 1929 |
| 2,039,025 | Papst | Apr. 28, 1936 |
| 492,518 | Gholson | Feb. 28, 1893 |
| 2,057,266 | Rippere | Oct. 13, 1936 |
| 2,053,561 | Jennison | Sept. 8, 1936 |
| 2,356,708 | Sileck | Aug. 22, 1944 |